United States Patent
Syed

(10) Patent No.: US 9,955,170 B2
(45) Date of Patent: Apr. 24, 2018

(54) PRESERVING IMAGE QUALITY IN TEMPORALLY COMPRESSED VIDEO STREAMS

(71) Applicant: Comcast Cable Communications, LLC, Philadelphia, PA (US)

(72) Inventor: Yasser F. Syed, Los Angeles, CA (US)

(*) Notice: Subject to any disclaimer, the term of this patent is extended or adjusted under 35 U.S.C. 154(b) by 0 days.

(21) Appl. No.: 15/091,167

(22) Filed: Apr. 5, 2016

(65) Prior Publication Data
US 2017/0048527 A1 Feb. 16, 2017

Related U.S. Application Data

(63) Continuation of application No. 13/182,633, filed on Jul. 14, 2011, now Pat. No. 9,369,723.

(51) Int. Cl.
| H04N 19/40 | (2014.01) |
| H04N 19/167 | (2014.01) |
| H04N 19/159 | (2014.01) |
| H04N 19/154 | (2014.01) |

(52) U.S. Cl.
CPC ......... *H04N 19/159* (2014.11); *H04N 19/154* (2014.11); *H04N 19/167* (2014.11); *H04N 19/40* (2014.11)

(58) Field of Classification Search
None
See application file for complete search history.

(56) References Cited

U.S. PATENT DOCUMENTS

| 5,659,539 | A | | 8/1997 | Porter et al. |
| 6,112,226 | A | | 8/2000 | Weaver et al. |
| 6,119,154 | A | | 9/2000 | Weaver et al. |
| 8,270,469 | B2 | * | 9/2012 | Chui ............... H04N 19/159 375/240.01 |
| 2002/0047892 | A1 | * | 4/2002 | Gonsalves, Jr. .. H04L 29/06027 348/14.06 |
| 2002/0159523 | A1 | | 10/2002 | Wang et al. |
| 2002/0163967 | A1 | * | 11/2002 | Youn ............... H04N 19/176 375/240.12 |
| 2002/0186769 | A1 | * | 12/2002 | O'Brien ........... H04N 19/40 375/240.12 |
| 2003/0233464 | A1 | * | 12/2003 | Walpole ........... H04L 29/06 709/231 |

(Continued)

OTHER PUBLICATIONS

European Search Report—EP App 12173831.4—dated May 19, 2016.

(Continued)

*Primary Examiner* — Reza Aghevli
(74) *Attorney, Agent, or Firm* — Banner & Witcoff, Ltd.

(57) ABSTRACT

When a temporally compressed video stream is decoded and subsequently re-encoded, quality is typically lost. The quality loss may be mitigated using information about how the source video stream was encoded during the re-encoding process. According to some aspects of the disclosure, this mitigation of quality loss can be facilitated by decoders that output such information and encoders that receive such information. These decoders and encoders may be separate devices. The functionality of these decoders and encoders may also be combined in a single device, such as a transcoding device. An example of the information that may be used during re-encoding is whether each portion of the original stream was intra-coded or non-intra-coded.

16 Claims, 10 Drawing Sheets

(56) References Cited

U.S. PATENT DOCUMENTS

| | | | |
|---|---|---|---|
| 2003/0236904 A1* | 12/2003 | Walpole | H04L 12/1881 |
| | | | 709/231 |
| 2007/0156924 A1 | 7/2007 | Ramalingam et al. | |
| 2008/0107185 A1 | 5/2008 | Lefol et al. | |
| 2009/0097560 A1 | 4/2009 | Robertson | |
| 2010/0104015 A1* | 4/2010 | Chatterjee | H04N 19/159 |
| | | | 375/240.16 |
| 2010/0118982 A1 | 5/2010 | Chatterjee et al. | |
| 2010/0260269 A1* | 10/2010 | He | H04N 19/159 |
| | | | 375/240.27 |
| 2010/0296580 A1 | 11/2010 | Metoevi et al. | |
| 2010/0296581 A1 | 11/2010 | Metoevi et al. | |
| 2010/0309977 A1* | 12/2010 | Andersson | H04N 19/176 |
| | | | 375/240.12 |
| 2011/0090960 A1* | 4/2011 | Leontaris | H04N 19/103 |
| | | | 375/240.12 |
| 2011/0142125 A1 | 6/2011 | Tripathi et al. | |
| 2012/0063515 A1* | 3/2012 | Panchal | H04N 19/176 |
| | | | 375/240.16 |
| 2012/0063967 A1* | 3/2012 | Tokuhiro | C01B 3/042 |
| | | | 422/186 |
| 2013/0039411 A1* | 2/2013 | Aoki | H04N 19/61 |
| | | | 375/240.03 |

OTHER PUBLICATIONS

Nov. 1, 2002—"Drift Compensation for Reduced Spatial Resolution Transcoding"—Yin, Peng et al—IEEE.
Jan. 1, 2002—"Drift compensation architectures and techniques for reduced-resolution transcoding"—Yin, Peng et al.—Visual Communications and Image Processing.
Mar. 1, 2001—"Object-Based Transcoding for Adaptable Video Content Delivery"—Vetro, Anthony et al.—IEEE.
Mar. 1, 2003—"Video transcoding architectures and techniques: an overview"—Christopolous, Charilaos et al.—IEEE.
Yasser Syed, "Keeping Video Quality Pristine Throughout the Production Process—Introducing 10-Bit 4:2:2 AVC/H.264 Encoding", SMPTE Conference, Oct. 27-29, 2009.
Jan. 4, 2018—European Office Action—EP 12173831.4.
Dec. 28, 2017—Canadian Office Action—CA 2,779,869.

* cited by examiner

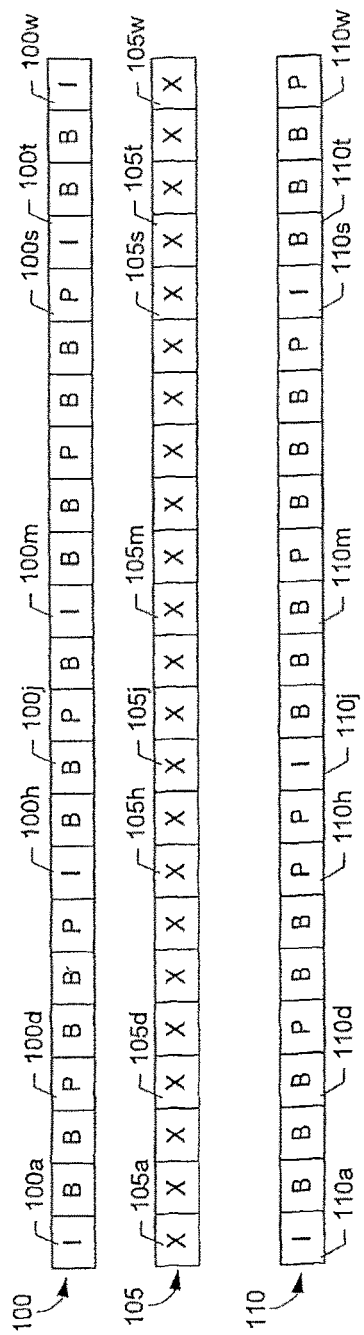
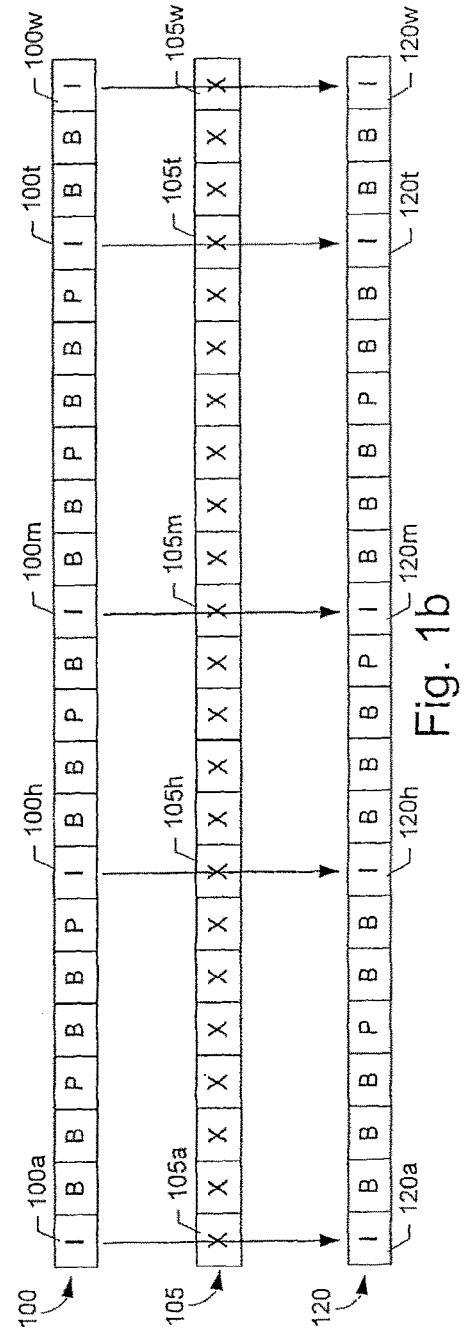
Fig. 1a
Fig. 1b

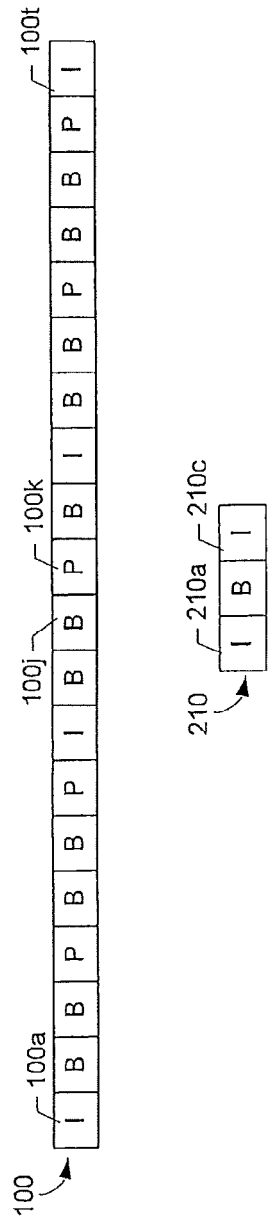
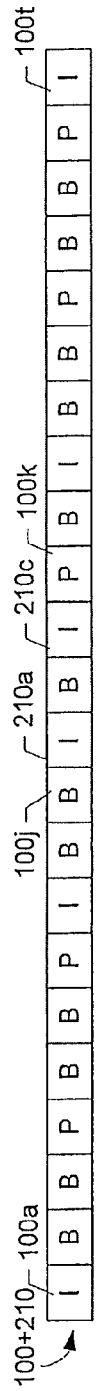
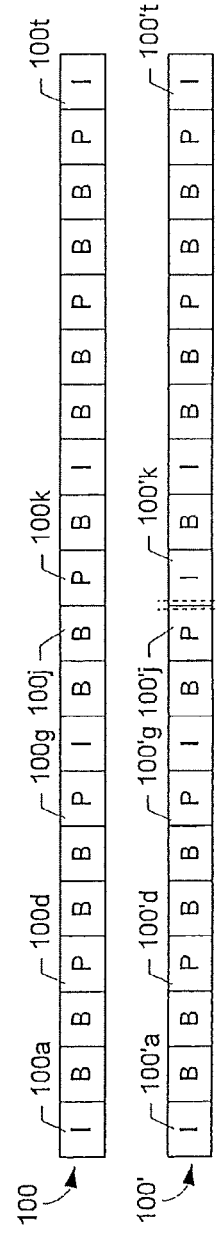
Fig. 2b
Fig. 2c

PRESERVING IMAGE QUALITY IN TEMPORALLY COMPRESSED VIDEO STREAMS

CROSS-REFERENCE TO RELATED APPLICATIONS

This application is a continuation of U.S. application Ser. No. 13/182,633, filed Jul. 14, 2011, the contents of which are hereby incorporated by reference in its entirety.

BACKGROUND

Video content is often compressed in order to save bandwidth during distribution. Some video compression standards, such as MPEG-2 and MPEG-4, part 10 (also known as AVC or h.264), utilize temporal compression. An example of temporal compression is encoding the image in a region, such as a frame or a portion of a frame, by referring to an earlier and/or later region. For instance, the image in a region may be encoded by the following three components: (1) a reference to an earlier region, (2) a motion vector, which specifies how the image from the earlier region should be moved, and (3) a residual error region that indicates how the image created from components (1) and (2) should be further modified. Encoding in this manner often requires less data than specifying the image without reference to an earlier region.

Regions that specify an image without reference to any other images are referred to as intra-coded. Intra-coded regions provide an initial image that temporally compressed regions may reference. Intra-coding may also save space. For example, the first image of a new scene may differ significantly from previous images. As a result, the above-referenced motion vector and residual error region may require more data to describe the image than would intra-coding and may also result in a greater loss of quality than intra-coding.

Where an intra-coded region is a whole frame, the frame is often referred to as an I-frame. (The "I" stands for intra-coded.) Non-intra-coded frames are often referred to as P-frames or B-frames. P-frames, or forward predicted frames, are frames that refer to an earlier frame in order to specify an image. (The "P" stands for predictive.) The three components described in the example above may constitute a P-frame. B-frames are frames that may refer to both an earlier frame and a later frame to specify an image. (The "B" stands bi-predictive.) The frames that these non-intra-coded frames refer to may be either intra-coded or non-intra-coded.

In some video compression schemes, each frame is divided up into regions. In some compression schemes these regions are known as slices. Further, frames may be divided into regions due to use of interlaced encoding instead of progressive scan encoding. Like entire frames, regions, such as slices, may be intra-coded or non-intra-coded. An I-frame may be made up of I-slices, a P-frame made up of P-slices, and a B-frame made up of B-slices. However, frames may also intermix regions, such as slices, of various types. For example, a frame may include some regions that are intra-coded and some regions that are non-intra-coded.

With most known video compression techniques, including those that use temporal compression, image quality is lost each time the video is encoded or transcoded. The quality loss may occur, for example, because intra-coded images and the above-referenced residual error regions are often spatially compressed. During the encoding or transcoding process, techniques such as spatial compression techniques (e.g., discrete cosine transforms and chroma subsampling) are often performed such that some image quality is lost during encoding in order to save space. Quality loss that occurs when a video is encoded or transcoded may be noticeable to a viewer. The loss may be amplified if an already encoded video is decoded and then encoded again. Thus, a need exists for systems and methods that help to minimize the quality loss that occurs when video is encoded, transcoded, or otherwise processed.

SUMMARY

Some aspects of the disclosure relate to methods and systems for decoding a video stream such that information about how the video stream was encoded is not lost. For example, information about which regions of the decoded stream were intra-coded, predictive-coded, or bi-predictive coded may be output from a decoder.

According to another aspect of the disclosure, encoders may receive an uncompressed video stream along with information relating to how regions of the uncompressed video stream were previously compressed. The encoder may use this information when determining how to encode each region.

According to a further aspect of the disclosure, transcoders may incorporate decoders and encoders that enable information about how the source video stream was encoded when determining how to encode each region.

According to yet another aspect of the disclosure, a source video stream may be packaged with data that identifies future alterations to the video stream, such as points in the video stream where an advertisement may be inserted. A decoder may output some or all of this data in addition to a decoded video stream. An encoder, including a transcoder, may use some or all of this data when determining how to encode each region.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIGS. 1a-1c illustrateexamples of how a video stream may be decoded and subsequently re-encoded.

FIG. 2b illustrates an example of how two video streams may be combined.

FIG. 2c illustrates and example of how a video stream may be transcoded to facilitate combining the video stream with another video stream.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

A video stream may be encoded, decoded, and subsequently re-encoded multiple times before reaching its audience. For example, a movie may first be encoded in a video camera on a movie set. The video from the camera may then be sent to a production studio. The production studio may then decode the video and modify it by, for example, deleting unneeded scenes. The movie, or other item of content, may then be re-encoded and sent to a content distributor, such as a services provider, data access location, television network, etc. The content distributor may decode and edit the video stream again. For example, the content distributor may insert commercials, censor the movie, or add video watermarking.

The video stream may be subsequently decoded and re-encoded in order for more edits to be made. It may also be decoded and re-encoded in order to change its format. For example, the movie may be encoded using MPEG-4, but it may need to be sent to viewers whose display device, television, or other video receiver can only decode MPEG-2. To accommodate such viewers, the MPEG-4 encoded movie may be decoded and then re-encoded using MPEG-2. The process of decoding and subsequently re-encoding a video stream may be referred to as transcoding.

Figure 1C:
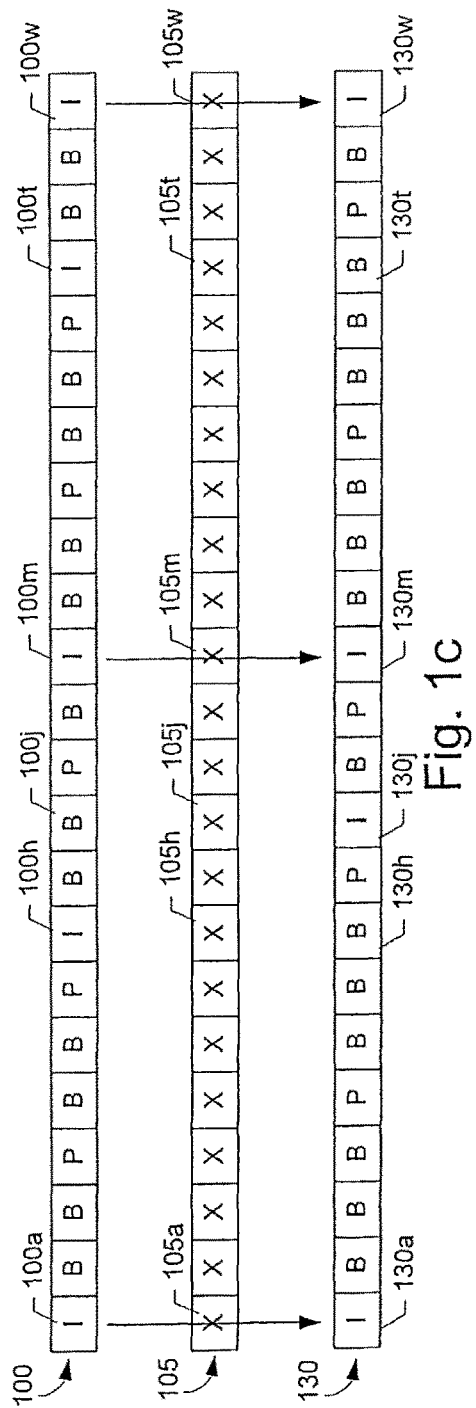

FIGS. 1*a-c* illustrate three examples of how a temporally compressed video stream 100 may be decoded and subsequently re-encoded. Using FIG. 1*a* as an example, a source stream, such as video stream 100, is decoded to an uncompressed format, such as video stream 105. Video stream 105 is then encoded to a temporally compressed format, such as video stream 110. Video stream 105 may be, for example, a series of bitmap images. Video streams 100 and 110 may be encoded, for example, using MPEG-2 or MPEG-4. Although edits may be made to the video stream after decoding but prior to encoding, such edits are not shown in FIGS. 1*a-c*. The process of decoding and encoding may be separate from one another in both space and time. Alternatively, they may be performed concurrently or sequentially such that the decoding and encoding may not appear to be separate to a user. The intermediate uncompressed format, which is represented by video stream 105, need not be output or kept after it is encoded to create video stream 110.

The format of a transcoded video stream (i.e. a video stream that has been decoded and subsequently re-encoded, such as video stream 110) may differ in one or more aspects from the format of the source video stream, such as video stream 100. Examples of how the formats of video streams may differ include the amount and type of spatial compression applied, the amount and type of temporal compression applied, the codec used to encode the stream, the frame rate of the stream, the resolution of the images of the stream, etc. Although transcoding is often performed in order to change a video stream from one format to another, a video may be decoded and subsequently re-encoded to the same format. This may occur, for example, to facilitate making edits to the video or adding video watermarking. Regardless of whether the format is changed, the process of re-encoding may still cause quality loss.

Each video stream, such as video stream 100, is illustrated as a series of temporally successive regions, each lettered a-w. Each region that contains an intra-coded image is labeled with an "I." Each region that contains a non-intra-coded image is labeled with a "P" or "B" to denote predictive or bi-predictive encoding, respectfully. Each region may be an entire frame, or each region may be a portion of a frame. In examples where each region is only a portion of a frame, a similar series of regions may exist for the other portions of the frame. Each region of video streams that are not temporally compressed, such as video stream 105, is labeled with an "X" instead of an "I," "P," or "B." Each X may represent, for example, an image in a bitmap format.

In FIG. 1*a*, video stream 100 is transcoded to video stream 110 without regard to whether the intra-coded regions of video stream 100 are also intra-coded in video stream 110. The process begins by decoding video stream 100 to an uncompressed format, which is represented by video stream 105. Then, video stream 105 is encoded to create video stream 110. The images encoded by many regions of video stream 110 are likely to lose quality as compared to video stream 100. Examples of the reasons for quality loss in stream 110 are discussed below.

Quality loss due to spatial compression may occur when an intra-coded image is transcoded to another intra-coded image. For example, the image encoded by region 110*a* ("image 110*a*") may be of lower quality than the image encoded by region 100*a* ("image 100*a*"). This loss of quality is likely to occur because the spatial compression used to encode image 110*a* from image 105*a* is likely to be lossy compression which, by its nature, is likely to lose some information from the source image (105*a*) in order to save space. The amount of spatial compression applied to an intra-coded image of a video stream, such as image 110*a*, may be determined based on, for example, a target bit rate for the video stream.

Quality loss may also occur due to spatial compression when a non-intra-coded image, such as image 100*j*, is transcoded to an intra-coded image, such as image 110*j*. In addition, a non-intra-coded source image is likely to be of lower quality than an intra-coded source image. A non-intra-coded image, by definition, is encoded by referring to another image, either directly or indirectly. For example, non-intra-coded image 100*j* may be encoded with reference to intra-coded source image 100*h*. The residual error region used to describe some of the differences between image 100*j* and image 100*h* may be spatially compressed. Thus, the quality losses associated with spatial compression of the residual error region may result in non-intra-coded source images, such as image 100*j*, having lower quality than intra-coded source images, such as 100*h*.

Quality loss may occur for at least two reasons when an intra-coded image, such as 100*h*, is transcoded to a non-intra-coded image, such as 110*h*. First, the non-intra-coded image is encoded by referring to another image, as described above. For example, image 110*h* is predictive coded, so it refers to one or more of the temporally previous images 110*a*-110*g*. Image 110*h* may directly refer to image 110*a*. Image 110*h* may also refer to image 110*a* indirectly by way of one or more of images 110*b*-110*g*. The above-described quality loss associated with transcoding to an intra-coded image, such as image 110*a*, is likely to be reflected when transcoding to a non-intra-coded image, such as image 110*h*, because the non-intra-coded image is encoded by referring, directly or indirectly, to the intra-coded image.

A second reason for quality loss when an intra-coded image is transcoded to a non-intra-coded image is spatial compression of the residual error region that helps describe the differences between the non-intra-coded image, such as 110*h*, and the image(s) to which the non-intra-coded image refers, such as one or more of 110*a*-110*g*. The quality losses associated with spatially compressing this residual error region will be reflected in non-intra-coded images, such as image 110*h*, in addition to quality losses associated with spatially compressing the images to which the non-intra-coded image refers. The amount of spatial compression applied to the residual error region, like the amount of spatial compression applied to intra-coded images, may be determined based on, for example, a target bit rate for the video stream.

The two reasons for quality loss described above also apply when non-intra-coded images, such as 100*d*, are transcoded to non-intra-coded images, such as 110*d*. Further, as discussed above with respect to image 100*j*, the source image itself is likely to be of lower quality because it is non-intra-coded and therefore subject to the quality losses associated with spatial compression of its residual error region.

In FIG. 1*b*, video stream 100 is transcoded to video stream 120 such that the regions of video stream 120 that are selected for intra-coding are the same regions that are intra-coded in video stream 100, as indicated by the vertical black arrows. Consequently, and advantageously, the quality loss associated with this transcoding is limited to the losses associated with transcoding intra-coded images to intra-coded images and with transcoding non-intra-coded images to non-intra-coded images. Notably, the additional quality losses associated with transcoding intra-coded images to non-intra-coded images are not present. Further, the larger amount of data typically required for intra-coding is not expended on regions for which the source is less likely to contain a lower-quality, non-intra-coded image. In addition, the non-intra-coded regions of video stream 120 are likely to be of higher quality because the intra-coded regions they reference are likely to have less quality loss. For at least these reasons, intra-coding the regions in video stream 120 that are intra-coded in video stream 100, as shown in FIG. 1*b*, helps reduce the overall quality loss associated with transcoding. Note that while all of the non-intra-coded regions of video stream 100 are also non-intra-coded in video stream 120, the same type of coding need not be used for each region. Thus, predictive-coded regions are re-encoded as bi-predictive-coded regions and vice versa in this example.

In some instances, the transcoding technique illustrated in FIG. 1*b* may be performed differently. For example, additional intra-coded regions may be included in the transcoded stream. This may occur, for example, in order to further reduce the quality loss. If the source stream is an MPEG-2 stream, or another stream in which predictive-coded regions tend to have less quality loss than bi-predictive regions, then some or all of the predictive-coded regions may be selected for intra-coding in the transcoded stream. Further, regions that are predictive-coded in the source stream may be selected for predictive-coding in the transcoded stream. This may be particularly useful if the transcoded stream is also in a format where predictive-coded regions tend to have less quality loss than bi-predictive-coded regions because the information about which regions have less quality loss will then be preserved for subsequent transcoding of the video stream. Alternatively, or in addition, less spatial compression may be applied to these higher-quality regions than is applied to other regions. For example, the quantization factors used to compress the result of a discrete cosine transform may be increased to reduce the amount of spatial compression. The amount of spatial compression may also be reduced, for example, by increasing the block size used for a discrete cosine transform. Increasing the number of motion vectors associated with each macroblock is another example of a way to reduce the amount of compression.

Another example of how the transcoding technique illustrated in FIG. 1*b* may be performed differently is when the transcoded video stream is to have fewer intra-coded regions than the source video stream. This may occur, for example, in order to save space. For instance, a target for the amount of space required to store the video stream in the transcoded format may be set. This target may be specified as an absolute target, or it may be an average bitrate of a video stream. Reducing the number of intra-coded regions may help to meet such a target because intra-coded images generally require more space than non-intra-coded images. Even if the number of intra-coded regions is reduced in the transcoded stream, quality loss can still be mitigated by aligning the intra-coded regions of the transcoded stream with intra-coded regions of the source stream. Because aligning these regions reduces the frequency with which intra-coded images are transcoded to non-intra-coded images, total quality loss may be reduced, as discussed above.

An example of this technique is seen in FIG. 1*c*. In this example, every other intra-coded region (a, m, and w) of video stream 100 is selected for intra-coding in transcoded video stream 130. Thus, at least for these regions, the quality losses associated with transcoding intra-coded images to non-intra-coded images are not present. Selecting ½ of the intra-coded regions of the source video stream for intra-coding in the transcoded video stream is merely exemplary. The target amount of space allocated to the transcoded stream may lead to any fraction of the intra-coded regions of the source stream being selected. For example, 10%, 20%, 30%, 40%, 60%, 70%, 80%, 90%, 100% or any other percentage of the intra-coded regions of the source stream may be selected for intra-coding in the transcoded video stream. Quality targets other than the amount of space allocated to the transcoded stream may also be used to determine which of the intra-coded regions of the source stream are selected for intra-coding in the transcoded stream. One example is that some or all IDR intra-coded regions of a source stream may be selected in order to facilitate seamless switching between streams in a multiple bitrate streaming environment, as will be discussed in more detail below. Another example of a quality target is a target percentage of the intra-coded regions of the source stream that will be intra-coded in the transcoded stream. Similarly, an average distance between intra-coded regions of the transcoded stream may be maintained, with the distance between individual intra-coded regions differing such that some or all of the intra-coded regions of the transcoded stream align with the intra-coded regions of the source video stream. This average distance may be specified in a variety of different ways, including, for example, a number of seconds (or fractions thereof), a number of frames, or an amount of space occupied by intervening regions, such as a number of bytes. By using these techniques, all of the regions that are intra-coded in the transcoded video stream will also be intra-coded in the source video stream.

Additionally, in some implementations non-intra-coded regions of the transcoded video stream, such as region 130*h*, that are transcoded from intra-coded regions of the source stream, such as region 100*h*, may be encoded with less spatial compression than other non-intra-coded regions. This may be done in order to mitigate the quality loss to these images for which the source image is expected to have higher quality.

In some implementations, regions of the transcoded video stream may be intra-coded even where the corresponding region of the source video stream is not intra-coded. For example, region 130*j* is intra-coded even though region 100*j* is not. Such additional intra-coded regions may or may not be included in the ratios and/or average distances between intra-coded regions discussed above. In addition to mitigating average quality loss, intra-coded regions that do not align with intra-coded regions of the source video stream may occur, for example, because adding another non-intra-coded region would result in too much estimated quality loss for a specific region or group of regions; because intra-coding the particular region requires less space than non-intra-coding; or because data associated with the stream indicates than an IDR (instantaneous decoding refresh) intra-coded region is appropriate, as will be discussed in more detail below with reference to FIGS. 2*a-c*. In some implementations, the factors that would otherwise cause an intra-coded image to be added at region j, such as those listed above, would instead result in a nearby region that aligns with an intra-coded image in the source stream being intra-coded. For instance, 130*h* may be intra-coded instead of 130*j* in some implementations. By using these techniques, all or substantially all of the regions that are intra-coded in the transcoded video stream may still be regions that are intra-coded in the source video stream. The above-listed reasons for including an intra-coded region in a transcoded video stream that does not align with an intra-coded region in the source video stream are expected to be rare. Thus, the number of regions that are intra-coded in the transcoded video stream that are not intra-coded in the source video stream may be less than 10%, less than 5%, or less than 1% of the intra-coded regions in the transcoded video stream.

Figure 2A:
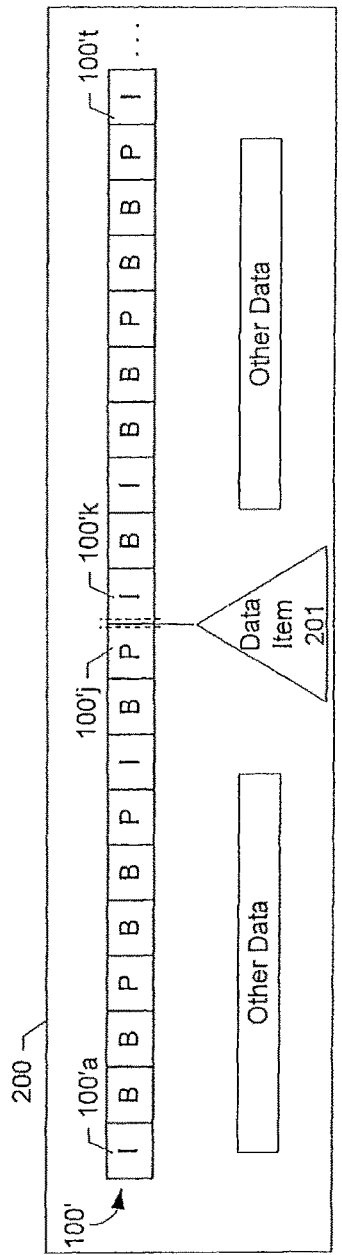
FIG. 2a illustrates an example of how a video stream may be packaged with other information.

A video stream may be packaged with additional information. For example, the video stream may be contained within a container, such as a transport stream, or otherwise accompanied by other information. In the example of FIG. 2*a*, video stream 100' is packaged with other data, including data item 201, in container 200. A video stream may be packaged with information about a video stream, such as a title or other identifier of the stream and time stamps of various points in the stream. This information may be useful, for example, when synchronizing an audio stream with the video stream. In some instances, the information packaged with the video stream indicates a potential change to the video stream. For example, data item 201 indicates that video stream 210 may be added to video stream 100' at the point in video stream 100' that occurs immediately after region 100'*j*.

FIG. 2*b* shows video stream 100, video stream 210, and an example of how these two video streams may be combined in response to a data item, such as data item 201. Notice that region 100*k*, which appears after video stream 210, is predictive-coded and therefore references regions of video stream 100 that occur before video stream 210. Similarly, region 100*j*, which occurs before video stream 210, is a bi-predictive region and therefore references regions that occur after video stream 210. Although video stream 210 contains only three regions in FIG. 2*b*, it may contain many more regions. If so, references to other regions that span the point at which video stream 210 is to be inserted may become overly burdensome for a video player to decode. For example, such references may result in regions being fetched twice. This would happen, for instance, if region 100*k* was fetched in order to decode region 100*j*, but region 100*k* had to be discarded from memory in the process of playing video stream 210. After video stream 210 ends, region 100*k* would have to be re-fetched. Similarly, because region 100*k* references earlier regions, such as 100*j*, those earlier regions may also need to be re-fetched if they too were discarded from the player's memory.

To avoid such issues, a video stream, such as video stream 100, may be encoded in a way that guarantees that no region prior to the point identified by an insert command refers to a region after the point. Similarly, the video stream may also be encoded in a way that guarantees that no region after the insertion point refers to a region prior to the insertion point. An encoder may guarantee both of these conditions by limiting the regions to which non-intra-coded regions may refer.

One example of how an encoder may guarantee that no references are made across a point is limiting the window of regions that the encoder searches for images that are similar to the image currently being encoded. For example, an encoder may normally encode the current image by searching the 5 temporally previous regions and the 5 temporally successive regions for the image that is most similar to the image currently being encoded. The current image may then be encoded as a non-intra-coded image that refers to the image identified as the most similar. However, if the normal search window crosses the insertion point, then the window may be modified to avoid crossing the point. For example, if the insertion point occurs 3 regions after the region that is currently being encoded, then the search window may be reduced to include the 5 temporally previous regions, but only the 3 temporally successive regions. Alternatively, the search window may be shifted to avoid crossing the insertion point while maintain the same size. For example, the window may contain the 7 temporally previous regions and the 3 temporally successive regions. This technique guarantees that no references are made across the insertion point if it is applied when each image is encoded.

Another example of an encoding technique that guarantees that no references are made across a point is to initially select the regions to which each image refers normally, but to modify the selection if it involves a reference across the point. For example, region 100*g*, may normally refer to region 100*d*, which refers to intra-coded region 100*a*. Because neither of these references crosses the point immediately after region 100*j*, region 100*g* may be encoded as it normally would. However, region 100*j* may normally refer to region 100*k*. Because the reference from 100*j* to 100*k* crosses the point, this initial selection may be modified in favor of a region that does not cross the point, such as 100*h*. The revised selection for which other regions to reference when encoding image 100*j* may be made on the basis of trial and error, or it may be made by searching within a window of allowable regions, similar to the technique described above.

In some cases, avoiding references across an insertion point may result in intra-coding a region that normally would have been non-intra-coded. For instance, region 100*k* may normally have been predictive coded, but disallowing references across the point immediately before region 100*k* may make intra-coding the most efficient way to encode image 100*k*.

Intra-coded regions that are not followed by any references to regions prior to the intra-coded region are sometimes called an IDR (instantaneous decoding refresh) regions. IDR regions may be decoded as if they are the first region in the stream. Thus, playback beginning at IDR regions may be instantaneous. An encoder may include an IDR region immediately after an insertion point.

Although a point across which references should not be made may be a point identified by an insert command, such as data item 201, it may also be a point identified by any command or other data that indicates that playback may be interrupted and/or any command or other data that indicates that information may be added to the video stream. The data that identifies the point may be included with a source video stream, such as stream 100. Alternatively, the data that identifies the point may be created or otherwise first associated with the video stream after it has been decoded (i.e. during the transcoding process). In either case, a video stream, such as video stream 100', may be encoded to avoid references that span the point, as described above.

Referring to FIG. 2*c*, video stream 100' is an example of what video stream 100 may look like if it were encoded using the techniques described above to avoid references across the point immediately after region 100*j*. Unlike region 100*j*, region 100'*j* does not reference any future regions; it is predictive-coded instead of a bi-predictive coded. Unlike region 100*k*, region 100'*k* does not reference any previous regions; it is intra-coded instead of predictive-coded. Of course, still further modifications may be made. For example, if region 100*i* references region 100*k*, region 100'*i* may be encoded to refer only to regions at or prior to 100'*j*. This may be done even if region 100'*i* and region 100*i* are both bi-predictive-coded.

In the example above, no regions of the video stream 100 were dropped when it was combined with video stream 210. In other examples, such as the example shown in FIG. 2*d*, regions of video stream 100 may be dropped when it is combined with another video stream in response to a data item, such as data item 201. In this example, the data item indicates that video stream 220 is to be inserted beginning at the point between region 100*j* and 100*k*. As seen in the combined video stream labeled 100+220, the inserted video stream 220 replaces regions 100*k*-100*m* of original video stream 100. This replacement ends at the point between regions 100*m* and 100*n*. This end point may be defined by the end of video stream 220. The end point may also be defined independent of the length of video stream 220. For example, an absolute location in the video stream or location that is defined relative to another point may be provided. At the end point, video stream 220 stops being inserted and original video stream 100 resumes. In the example seen in FIG. 2*d*, the end point occurs just before region 100*n*, so region 100*n* is the first region of the combined video stream that occurs after the inserted video stream 220. An example of a signal that may define beginning and end points as described above is an SCTE-35 signal.

Figure 2D:
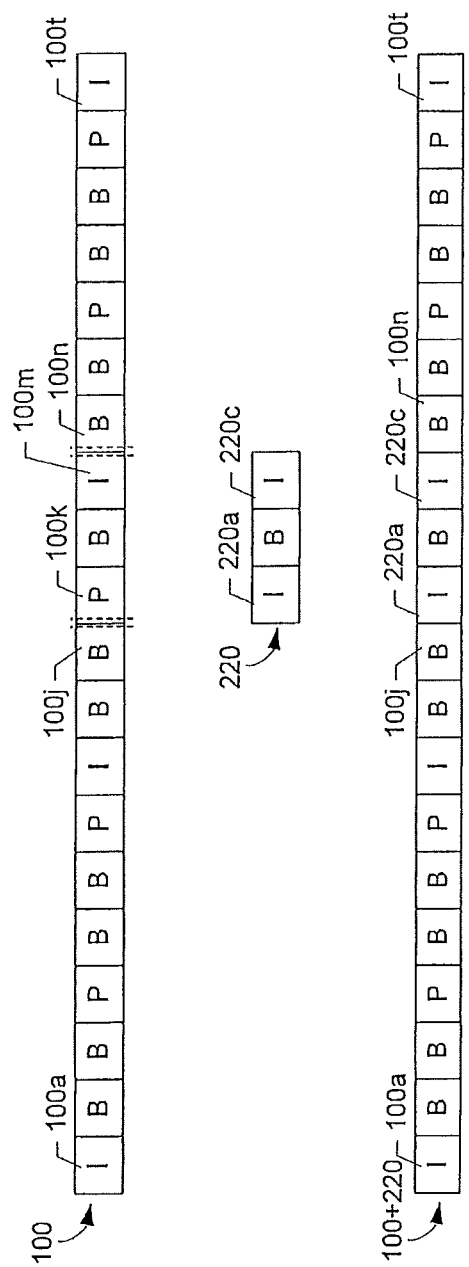
FIG. 2d illustrates another example of how two video streams may be combined.

As seen in FIG. 2*d*, the combination of video streams 100 and 220 may be problematic for similar reasons to those discussed above with reference to FIG. 2*b*. For example, regions 100*j* and 100*n*, among others, may reference region 100*m*, which has been replaced in the combined stream shown in FIG. 2*d*. Thus, decoding these regions may require knowledge of this replaced intra-coded region. Modifying video stream 100 to avoid references that span the beginning point and to avoid references that span the end point avoids this problem. Video stream 100 may be so modified using the techniques described above. Further, the techniques described above need not be applied to the regions that are to be omitted from the combined stream. In the example of FIG. 2*d*, region 100*j* may be encoded as described above to avoid references across the insertion point, but region 100*k* may be encoded without regard to the insertion point because it will be omitted.

In many of the examples of transcoding discussed so far, the encoder has knowledge of how some or all of the regions being encoded were previously encoded. For example, in FIG. 1*b*, video stream 120 is encoded from video stream 105, and the encoding is performed using information about which regions of source video stream 100 were intra-coded. This knowledge about the source video stream may be obtained in a variety of ways. If the encoder has access to the source stream, then the decoder may simply consult the source stream to obtain this information. It may do so before beginning the process of encoding, or it may do so as it encodes. Although the obtained information may be saved, it may also be discarded once it is no longer needed, such as once encoding is complete.

The information that the encoder may obtain includes, for example, an identification of all the regions that were intra-coded in the source stream. Alternatively, the encoder may obtain an identification of only certain regions that were intra-coded in the source stream. As seen in the example of FIG. 1*c*, fewer intra-coded regions may exist in the transcoded stream than exist in the source stream in order to save space. In this example, only the intra-coded regions of the source stream that will also be intra-coded in the trascoded stream (a, m, and w) need to be identified. Additional intra-coded regions of the source stream may be identified but not selected for intra-coding in the transcoded video stream. This may occur, for example, where the decision about which regions will be intra-coded in the transcoded stream has not yet been made.

In some instances, the encoder may obtain identifications of regions that are not intra-coded as well. It may obtain identifications of every non-intra-coded region of the source stream, or it may obtain identifications of only some regions. The encoder may use these identifications in a number of different ways. For example, the encoder may identify regions that are to be intra-coded, regardless of whether the region was intra-coded in the source stream. The encoder may also obtain identifications of regions that are to be encoded with less compression or higher quality than other regions, whether or not those regions are to be intra-coded. These regions may be, for example, predictive-coded regions where the codec used for the source stream makes it likely that predictive-coded regions are of higher quality than other regions. The non-intra-coded regions may be identified separately from identifications of other regions, such as intra-coded regions, or they may be identified together with identifications of other regions. Similarly, each identification may explicitly indicate how the source region was encoded. Alternatively, one or more lists of regions may also be stored without such additional information.

Figure 3:
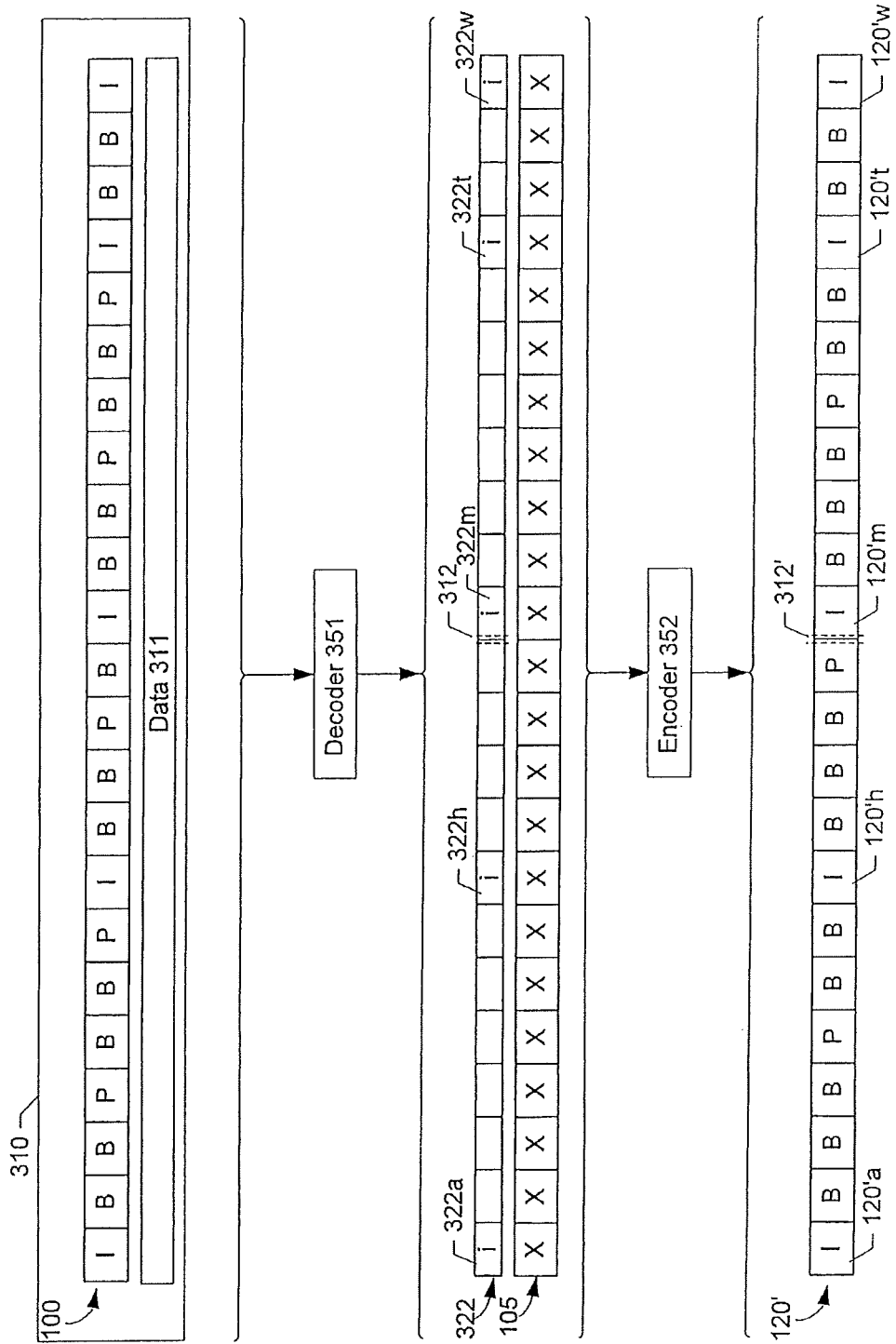
FIG. 3 illustrates an example of the data that may be received by and output from both a decoder and an encoder.
Figure 6:
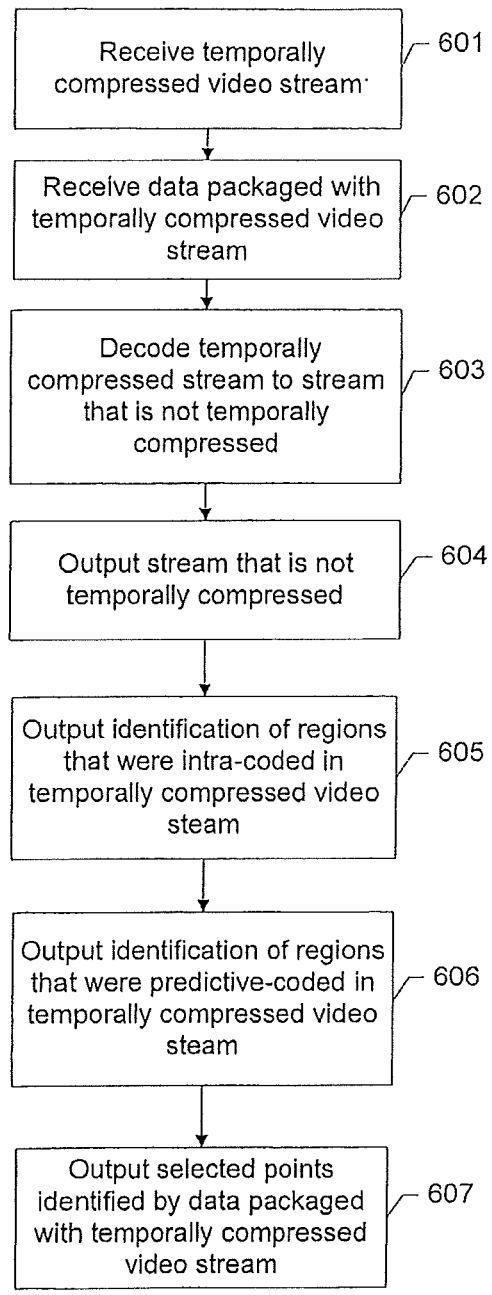
FIG. 6 shows an illustrative example of a method that may be used when decoding a temporally compressed video stream.
Figure 7:
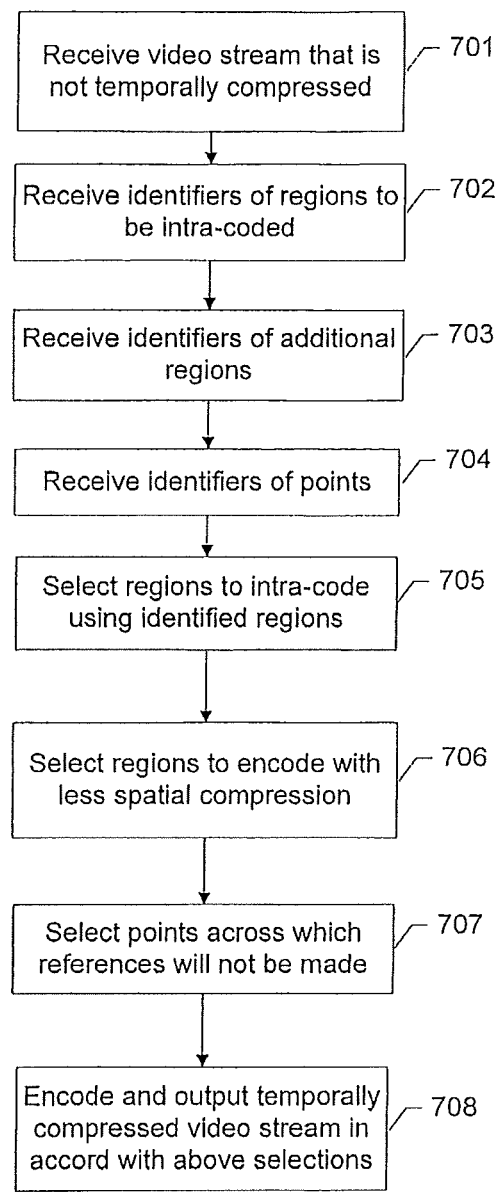
FIG. 7 shows an illustrative example of a method that may be used when encoding a video stream as a temporally compressed video stream.

Although identifications of regions are discussed above with respect to the encoder, the decoder may also identify regions in the same manner as discussed above. An encoder may then receive these identifications and use them when encoding a video stream. FIG. 3 illustrates an example of the data that may be received by and output from both a decoder and an encoder. These data items will be described with reference to a method that may be used by a decoder, which is illustrated in FIG. 6, as well as with reference to a method that may be used by an encoder, which is illustrated in FIG. 7.

In step 601, the decoder receives a temporally compressed video stream, such as video stream 100 as seen in FIG. 3. In step 602, the decoder receives data packaged with the temporally compressed video stream, such as data 311. Data 311 may include, for instance, data indicating that an advertisement is to be inserted into the video stream at point 312. Although a decoder might receive only a video stream in some implementations, the example of FIG. 3 illustrates decoder 351 receiving all of the data in container 310.

In step 603, the decoder decodes the temporally compressed stream such that it is no longer temporally compressed. The decoded stream, such as stream 105, is then output in step 604. The decoded stream may be output to any destination. For example, it may be output directly to an encoder, as shown in FIG. 3, or it may be output to another device, such as a storage media or video editing platform.

In step 605, an identification of regions that were intra-coded in the temporally compressed video stream, such as data 322, is output. Again, the output may be to any destination. In the example of FIG. 3, regions a, h, m, t, and w are identified by data 322. Although a decoder may output an identification of all of the intra-coded regions, it may also output an identification of only some of the intra-coded regions, as discussed above. Further, it may also output identifications of non-intra-coded regions. For example, in step 606 the decoder may output an identification of regions that were predictive-coded in the temporally compressed video stream. A decoder may also output identifications of selected points identified by data packaged with the temporally compressed video stream, as in step 607. Data 322 identifies point 312, which was included in data 311 and may be, for example, an insertion point. Once the data discussed in steps 604-607 is output, the received temporally compressed video stream may be discarded. It need not be output by the decoder, and re-encoding may be performed without reference to the received temporally compressed video stream using the data output in steps 604-607, such as video stream 105 and data 322.

Points and/or regions, such as those in data 322, may be identified in a variety of different ways. For example, a series of flags may be placed in or along with the video stream. For example, the flags may be contained in an MPEG Transport Stream. Each flag may correspond to a region. In this case, intra-coded regions may be identified by whether a flag associated with the region is one that indicates intra-coding. A flag indicating a point may be inserted between flags associated with regions or in positions associated with the regions immediately before or after the point. In the latter case, some flags may indicate both an encoding type, such as intra-coding, and that references should not be made across the point. A flag may be as small as a single bit, such as a 1 to indicate intra-coding and a 0 to indicate other coding.

Other examples of how points and/or regions may be identified include, for example, timestamps. A variety of timestamp formats may be used, including, for example, presentation time stamps (PTS), decoding time stamps (DTS), Society of Motion Picture and Television Engineers (SMPTE) time codes, etc. Alternatively, or in addition, sequence numbers of frames and/or regions may be used.

Where the identified regions are less than an entire frame, a specific region within a frame may be identified by a coordinate or coordinates, region name(s), region number(s), or other identifiers that maps to a portion of a frame. However, a separate identifier of where a region is within a frame may not be needed. For example, a sequence number may identify a specific portion of a frame rather than the frame as a whole. Also, identifiers of regions within frames may be used only where the regions within the frame are to be encoded differently. For instance, if all of the regions within a frame are to be intra-coded, then an identification of the whole frame, such as a time stamp or sequence number alone, may be sufficient.

The information output from a decoder may be received, directly or indirectly, by an encoder, such as encoder 352. Encoder 352 may utilize the method illustrated in FIG. 7.

In step 701, the encoder receives a video stream that is not temporally compressed. In step 702 the encoder receives identifiers of regions to be intra-coded, and in step 703 the encoder received identifiers of additional regions. Finally, in step 704, the encoder received identifiers of points. In FIG. 3, these step are illustrated by encoder 352 receiving data 322 as well as video stream 105. Although data 322 does not happen to include identifiers of regions besides intra-coded regions, it could in other examples.

In step 705, regions to intra-code are selected using the regions identified by the data received in step 702. As discussed above, it is possible to intra-code a greater or fewer number of regions than the number identified by data 322 in order to balance quality and compressions for a given situation.

In step 706, regions to encode with less spatial compression are selected. As discussed above, it may be desirable to encode certain regions with more or less spatial compression than others based on the likely quality of the source image. Examples of such regions may include regions that were identified in step 702 but not selected in step 705 and/or regions identified in step 703.

In step 707, points across which references will not be made, such as insertion points, are selected. Although the example of FIG. 3 illustrates only point 312, additional points, such as additional insertion points, may be included in the data received by the encoder in step 704. Some such points may not be selected as ones across which references may not be made. For example, the video to be inserted at the point may be inserted by the encoder itself; the video to be inserted at the point may not be long enough to warrant avoiding references across it; or the point may not be related to inserting video or otherwise adding data or interrupting the video stream.

In step 708, the video stream is encoded and output in accord with the selections discussed above. In FIG. 3, this is illustrated by the output video stream 120'. In this example, data 322 was used to select each of regions a, h, m, t, and w for intra-coding. Data 322 was also used to ensure that no regions reference other regions across point 312'. Although not shown in FIG. 3, output video stream 120' may be packaged with other data, such as some or all of data 311.

An encoder, such as encoder 352, may receive data, such as data 322 and/or video stream 105, from one or more sources. Some or all of those sources may be external to the encoder, and some or all of the sources may be external to the decoder as well. For example, encoder 352 may receive video stream 105 and data 322 from one or more computers used for editing the video stream. Alternatively, or in addition, an encoder may generate data, such as some or all of data 322, itself.

Figure 8:
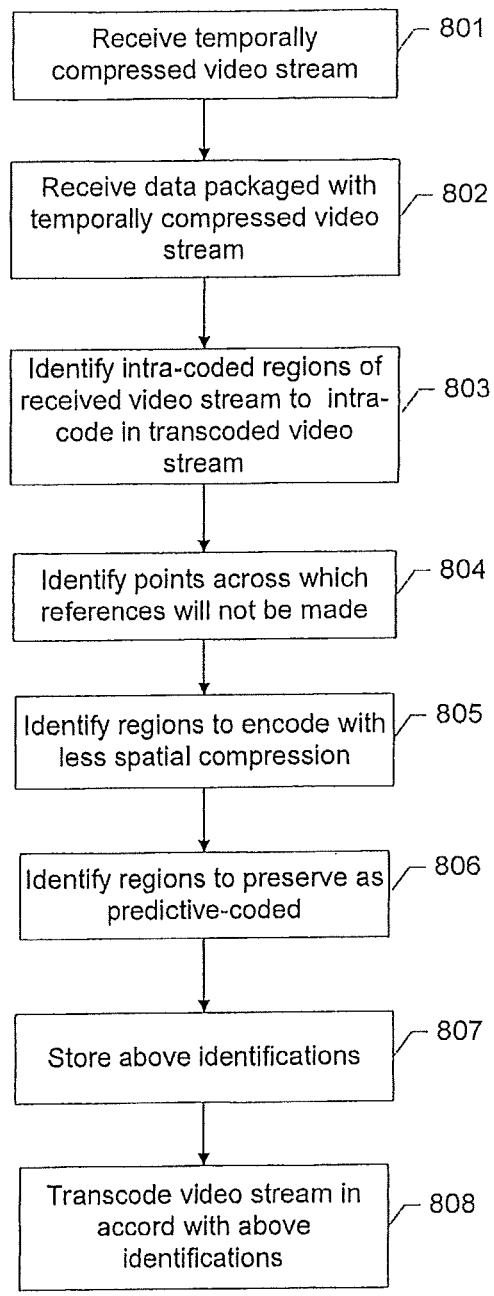
FIG. 8 shows an illustrative example of a method that may be used when transcoding a temporally compressed video stream.

In some instances, a decoder, such as decoder 351, and an encoder, such as encoder 352, may be integrated together into a transcoder. A transcoder may utilize the methods described above with reference to FIGS. 6 and 7. It may also utilize the method described below with reference to FIG. 8.

In step 801 a temporally compressed video stream is received, such as video stream 100 as seen in FIG. 3. This stream may be, for example, an MPEG-4 encoded movie that is to be transcoded to MPEG-2 format. Data packaged with the temporally compressed video stream, such as insertion points, is received in step 802. Intra-coded regions of the received video stream that are also to be intra-coded in the transcoded video stream are identified in step 803. Points across which references will not be made are identified in step 804, and regions to encode with less spatial compression are identified in step 805. The above identification may be performed in a variety of ways, as discussed above with reference to the selections in steps 705, 706, and 707 of FIG. 7. In step 807 the above identifications are stored. They may be stored for later reference, or they may be stored only for use in step 808, in which the video stream is transcoded in accord with the above identifications. In the case where some or all of the steps of the above method are performed repeatedly, such as when transcoding is performed on a region-by-region or scene-by-scene basis, some of the identifications stored in step 807 may be lost before other identifications are first made.

Figure 4:
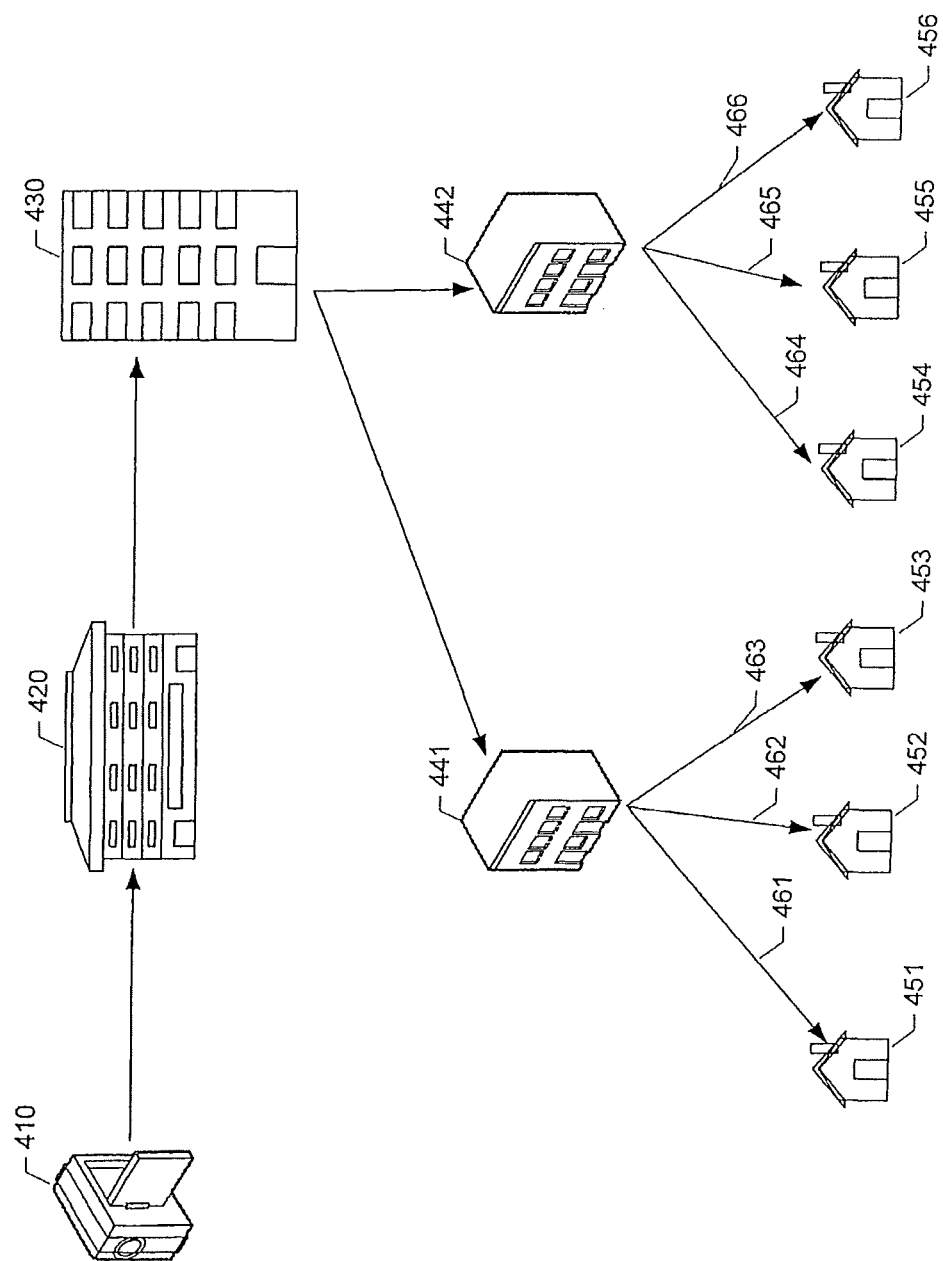
FIG. 4 illustrates an example of how a video stream may be repeatedly decoded and subsequently re-encoded prior to reaching its audience.

A video stream may be transcoded (i.e. decoded and subsequently re-encoded) many times prior to reaching its audience. Using the techniques discussed above to perform some or all of the decodings and re-encodings will likely help to preserve the quality of the video stream that ultimately reaches the audience. As seen in the example of FIG. 4, a video stream may be first encoded in a video camera, such as camera 410. The video stream from the camera may then be edited at a production studio 420. This editing may include decoding and modifying the original images to add special effects or other enhancements. It may also include adding images from other sources, such as other cameras, to the video stream. Data accompanying the decoded video stream, such as data 322, may need to be adjusted to reflect any edits. For example, if a scene is inserted, then the sequence number associated with frames after the scene may change. Once editing is complete, the stream may be re-encoded and sent from production studio 420 to content distributor 430.

Content distributor 430 may further edit the video stream. For example, content distributor 430 may decode the video stream in order to delete scenes and/or insert other video, such as advertisements. Content distributor 430 may also associate data with points in or segments of the video stream. For example, content distributor 430 may associate data that indicates when other video, such as an advertisement, should be added to the stream. An example of such data is an SCTE-35 signal. Such data may be added to the data used by an encoder, such as data 322. Content distributor 430 may then re-encode the video stream and distribute the stream, along with any added data, to regional content distributors, such as regional distributors 441 and 442.

Regional distributors 441 and 442 may insert advertisements but not decode and re-encode the video stream. This is particularly likely if content distributor 430 re-encoded the stream such that non-intra-coded regions do not reference other regions across the point at which the advertisements are to be inserted. Alternatively, regional distributors 441 and 442 may decode the video stream and alter it by, for example, adding advertisements where indicated by data associated with the video stream, such as SCTE-35 signals. The video stream may then be re-encoded and forwarded to, for example, terminals located in homes 451-456. Such terminals may also transcode the video stream. The terminals in this example may be of any type and need not be confined to homes 451-456. They may also be located, for example, in offices or outdoors. Examples of terminals include cellular phones or other devices equipped with cellular radios; computers; home gateways; video receivers, such as those included in a television or separately located in a "set top box;" and any other device capable of displaying and/or outputting a video stream.

In each of the examples of decoding and re-encoding described above, the re-encoded video stream may be encoded in a different format than the stream that was decoded. This may be done, for example, in order to ensure compatibility with the device that is to receive the video stream; to save space on a storage medium, such as a hard drive or optical disk; to avoid over-burdening a communication link; or simply as a matter of preference. For example, regional content distributors 441 and/or 442, may re-encode the video stream in a more compressed format than the format in which it was received in order to enable real-time delivery of the stream over communication links 461-466. Similarly, regional content distributors may re-encode the video stream in a format that is compatible with the terminals in homes 451-456.

FIG. 4 is merely an example of how a video stream may be decoded and re-encoded multiple times. Many other examples are possible. For example, regional content distributors 441 and/or 442 may forward the video streams to further intermediaries instead of directly to the terminals in homes 451-456. Alternatively, fewer cycles of decoding and re-encoding may be present. For example, regional distributors 441 and/or 442 may not exist. Instead, the video stream output from content distributor 430 may be received by terminals in homes 451-456.

The decoding, encoding, and transcoding techniques of this disclosure may be used in conjunction with multiple bitrate streaming. Where multiple bitrate streaming is used, a single item of content may be transmitted in more than one format. For example, the item of content may be transmitted in a high-bandwidth format to terminals capable of receiving this format, but the same item of content may be transmitted in a lower-bandwidth format to terminals that cannot receive the high-bandwidth format. In some examples of multiple bitrate streaming, the format received by a single terminal may be altered in the middle of the content. For example, a video on demand server that uses multiple bitrate streaming may transmit a first portion of a video to a terminal in a first format, but then transmit a second portion of the video to the terminal in a higher- or lower-bandwidth format. The change in format may be made, for example, in response to changes in the bandwidth available on the communications link between the server and the terminal.

A discussed above, a multiple bitrate streaming server may transmit a single piece of content in multiple formats. A copy of the content in all of these formats may be received by the streaming server. Alternatively, a multiple bitrate streaming server may receive the content in only a subset of the formats in which the content may be transmitted from the server. The streaming server can generate additional formats of the content by transcoding one of the copies of the received content. Quality loss can be mitigated by using the highest quality copy of the content for the transcoding. The highest quality copy may be, for example, the copy having the highest bitrate. Quality loss can also be mitigated by performing the transcoding using the techniques described above. The techniques described above are additionally advantageous in the example of multiple bitrate streaming because they can be used to aligning the IDR intra-coded regions of the transcoded stream with the IDR intra-coded regions of the source stream. This alignment allows a streaming server to change between transmitting the source and transcoded streams without transmitting any regions in more than one format. A device other than a streaming server may also generate transcoded streams with the above-described alignment of IDR intra-coded regions. An entire set of aligned streams may be generated, or an existing set of aligned streams may be augmented.

Figure 5:
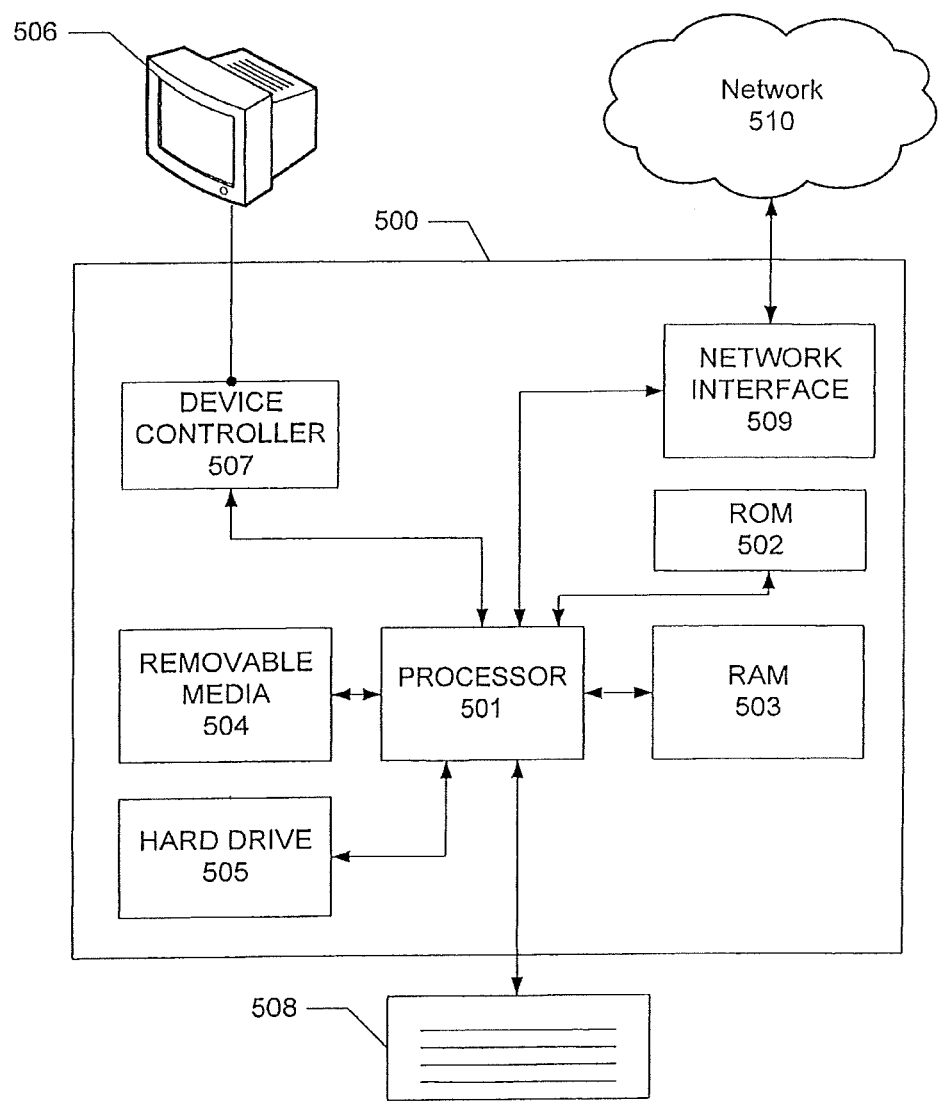
FIG. 5 illustrates an example of general hardware elements that can be used to implement various computing devices, including decoders, encoders, and transcoders.

FIG. 5 illustrates an example of general hardware elements that can be used to implement any of the various computing devices discussed above, such as decoder 351, encoder 352, devices including decoders and encoders (such as transcoders), and terminals 451-456. Each of these computing devices may also be referred to as a processing device. The computing device 500 may include one or more processors 501, which may execute instructions of a computer program to perform any of the features described herein. The instructions may be stored in any type of computer-readable medium or memory, to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), floppy disk drive, or any other desired electronic storage medium. Instructions may also be stored in an attached (or internal) hard drive 505. The computing device 500 may include one or more output devices, such as a display 506 (or an external television), and may include one or more output device controllers 507, such as a video processor. There may also be one or more user input devices 508, such as a remote control, keyboard, mouse, touch screen, microphone, etc. The computing device 500 may also include one or more network interfaces, such as input/output circuits 509 (such as a network card) to communicate with an external network 510. The network interface may be a wired interface, wireless interface, or a combination of the two. In some embodiments, the interface 509 may include a modem (e.g., a cable modem). Network 510 may include communication lines such as optical cables, coaxial cables, Ethernet cables, satellite or other wireless links (including cellular links), etc. Computing device 500 may connect to a plurality of networks simultaneously. Network Interfaces 509 may have dedicated hardware for each network, or some or all of the hardware may serve multiple networks simultaneously.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, by a computing device, a decoded video stream that has been decoded from a source stream;
   receiving, by the computing device, a first dataset indicating a first set of regions, within the decoded video stream, that have been designated for intra-coding into an encoded video stream;
   selecting, from the first set of regions indicated in the first dataset and based on a quality target for the encoded video stream, a first subset of regions to intra-code within the encoded video stream, wherein the quality target comprises a target percentage of intra-coded regions in the source video stream that will be intra-coded in the encoded video stream; and
   encoding the decoded video stream to generate the encoded video stream, wherein the encoding comprises intra-coding each region from the first subset of regions into the encoded video stream.

2. The method of claim 1, further comprising:
   selecting, from the first set of regions, a second subset of regions designated for predictive-coding into the encoded video stream,
   wherein encoding the decoded video stream comprises predictive-coding each region from the second subset of regions into the encoded video stream.

3. The method of claim 1, wherein each region in the first set of regions is a different portion of a same frame in the decoded video stream.

4. The method of claim 1, wherein each region in the first set of regions is a different frame in the decoded video stream.

5. The method of claim 1, further comprising:
receiving, by the computing device, a second dataset indicating a second set of regions within the decoded video stream that have been designated for predictive-coding in the encoded video stream; and
selecting, from the second set of regions, a second subset of regions to intra-code in the encoded video stream.

6. The method of claim 5, wherein the selecting, from the second set of regions, the second subset of regions to intra-code into the encoded video stream is performed responsive to a determination of a quality loss that would result from predictive-coding the second subset of regions into the encoded video stream.

7. A method comprising:
receiving, by a computing device, a first encoded video stream and a second encoded video stream;
inserting, by the computing device, the second encoded video stream into the first encoded video stream to generate a third encoded video stream, wherein the second encoded video stream is inserted between a first point and a second point of the first encoded video stream; and
modifying, by the computing device, the third encoded video stream such that no non-intra-coded region prior to a first point refers to a region after the second point, and no non-intra-coded region after the second point refers to a region before the first point.

8. The method of claim 7, wherein modifying the third encoded video stream comprises intra-coding a plurality of non-intra-coded regions in the third encoded video stream.

9. The method of claim 7, further comprising: removing one or more regions of the first encoded video stream prior to inserting the second encoded video stream into the first encoded video stream.

10. The method of claim 7, further comprising: ensuring that a given non-intra-coded region in the third encoded video stream refers to another region within a maximum distance of the given non-intra-coded region.

11. The method of claim 10, wherein the maximum distance comprises five successive regions.

12. The method of claim 7, further comprising: inserting an instantaneous decoding refresh region after the second point.

13. The method of claim 7, wherein the first point and the second point are identified in the first encoded video stream.

14. One or more non-transitory computer readable storage media storing computer executable instructions that, when executed by a computing device, cause the computing device to:
receive a first encoded video stream;
determine that a second encoded video stream is to have fewer intra-coded regions than the first encoded video stream;
determine a set of intra-coded regions within the first encoded video stream;
select, from the set of intra-coded regions and based on a quality target for the second encoded video stream, a subset of regions to intra-code into the second encoded video stream wherein the quality target comprises a target percentage of intra-coded regions in the first encoded video stream that will be intra-coded in the second encoded video stream; and
encode the first encoded video stream into the second encoded video stream, wherein the encoding comprises intra-coding each region in the subset of regions from the first encoded video stream into the second encoded video stream.

15. The one or more non-transitory computer readable storage media of claim 14, wherein each region in the set of intra-coded regions is a different slice of a same frame of the first encoded video stream.

16. The one or more non-transitory computer readable storage media of claim 14, wherein determining that the second encoded video stream is to have fewer intra-coded regions than the first encoded video stream comprises determining that the second encoded video stream is to have fewer intra-coded regions than the first encoded video stream further based on an amount of space required to store the second encoded video stream.

* * * * *

UNITED STATES PATENT AND TRADEMARK OFFICE
CERTIFICATE OF CORRECTION

PATENT NO. : 9,955,170 B2
APPLICATION NO. : 15/091167
DATED : April 24, 2018
INVENTOR(S) : Syed It is certified that error appears in the above-identified patent and that said Letters Patent is hereby corrected as shown below:

On the Title Page

Column 1, (72) Inventor, Line 1:
After "(US)", insert --¶(73) Assignee: Comcast Cable Communications, LLC, Philadelphia, PA (US)--

In the Drawings

Sheet 8 of 10, Fig. 6, Reference Numeral 605, Line 4:
Delete "steam" and insert --stream-- therefor Sheet 8 of 10, Fig. 6, Reference Numeral 606, Line 4:
Delete "steam" and insert --stream-- therefor In the Specification Column 1, Background, Line 48:
After "stands", insert --for-- therefor Column 2, Brief Description of the Drawings, Line 52:
Delete "illustrateexamples" and insert --illustrate examples-- therefor Column 2, Brief Description of the Drawings, Line 58:
Delete "and" and insert --an-- therefor Column 10, Detailed Description, Line 41:
Delete "trascoded" and insert --transcoded-- therefor Signed and Sealed this
Ninth Day of April, 2024

Katherine Kelly Vidal
*Director of the United States Patent and Trademark Office*